United States Patent
O'Neil

(10) Patent No.: US 6,778,818 B1
(45) Date of Patent: Aug. 17, 2004

(54) ENHANCED 911 SYSTEM FOR PROVIDING WITNESS IDENTIFICATION IN A WIRELESS COMMUNICATION SYSTEM

(75) Inventor: Joseph Thomas O'Neil, Staten Island, NY (US)

(73) Assignee: AT&T Corp., New York, NY (US)

(*) Notice: Subject to any disclaimer, the term of this patent is extended or adjusted under 35 U.S.C. 154(b) by 463 days.

(21) Appl. No.: 09/883,525

(22) Filed: Jun. 18, 2001

(51) Int. Cl.[7] .............................................. H04Q 7/20
(52) U.S. Cl. ............................. 455/404.1; 455/404.2; 455/456.1; 379/45
(58) Field of Search ..................... 455/404.1, 404.2, 455/456.1, 456.2, 456.3, 521, 424, 414.1; 379/33, 37, 45

(56) References Cited

U.S. PATENT DOCUMENTS

| | | | | |
|---|---|---|---|---|
| 5,786,791 A | * | 7/1998 | Bruckert .................. 342/457 |
| 5,797,093 A | * | 8/1998 | Houde ..................... 455/404.1 |
| 5,890,068 A | * | 3/1999 | Fattouche et al. ........ 455/456.2 |
| 6,064,722 A | * | 5/2000 | Clise et al. .................. 379/37 |
| 6,091,959 A | * | 7/2000 | Souissi et al. ......... 340/825.49 |
| 6,393,294 B1 | * | 5/2002 | Perez-Breva et al. .... 455/456.5 |
| 6,625,458 B2 | * | 9/2003 | Pihl et al. ................ 455/456.1 |

* cited by examiner

*Primary Examiner*—Cong Van Tran

(57) ABSTRACT

The provisioning of enhanced 911 service in a mobile communications network is supplemented to include the capability of identifying other mobile stations in close proximity to a mobile station placing a 911 call. This capability may then be used to aid in the identification of witnesses to a crime, car accident, and the like. Constantly updated location information for mobile stations in communication with a switching center is maintained in a database that can be accessed by PSAP agents on an "as needed" basis. In particular, a PSAP agent can submit a search request, using time/date and geographic location information to determine the identity of all mobile stations in a predetermined "radius" associated with a 911 caller.

12 Claims, 15 Drawing Sheets

SYSTEM ARCHITECTURE

LEGEND:
ROA = RECEIVE- ONLY ANTENNA
PS = POSITION SERVER

LAST RECORDED GEOGRAPHIC POSITION

| TEL. NUMBER | DATE/TIME OF MEASUREMENT | LATITUDE | LONGITUDE |
|---|---|---|---|
| XXX-YYY-ZZZZ | | 25 | 22 |
| AAA-BBB-CCCC | | 20 | 20 |
| DDD-EEE-FFFF | | 25 | 23 |
| GGG-HHHH-IIII | | 30 | 23 |
| . . . | . . . | . . . | . . . |
| LLL-MMM-NNNN | | 38 | 21 |

*FIG. 7*

| TEL. NUMBER OF NEAR-BY MOBILE | DATE/TIME OF LAST RECORDATION | LATITUDE OF NEAR-BY | LONGITUDE OF NEAR-BY |
|---|---|---|---|
| AAA- | | 20 | 20 |
| DDD- | | 25 | 23 |
| GGG- | | 30 | 23 |
| . | . | . | . |
| . | . | . | . |
| . | . | . | . |
| | | | |

LEGEND:
PS = POSITION SERVER

| MSC- BASED GEPGRAPHIC LOCATION |||| 
|---|---|---|---|
| TEL. NUMBER | DATE/TIME | LATITUDE | LONGITUDE |
| AAA-BBB-CCCC | | | |
| | | | |
| LLL-MMM-NNNN | | | |
| ⋮ | | | |
| | | | |

FIG. 13

| MSC ID | NETWORK ADDRESS | NW LAT;LONG | NE LAT;LONG | SW LAT;LONG | SE LAT;LONG |
|---|---|---|---|---|---|
| | | | | | |
| MSC 048 | ⌊_⌋ | | | | |
| | | | | | |
| | | | | | |

FIG. 16

ENHANCED 911 SYSTEM FOR PROVIDING WITNESS IDENTIFICATION IN A WIRELESS COMMUNICATION SYSTEM

TECHNICAL FIELD

The present invention relates to the provisioning of enhanced 911 service in a wireless communication environment and, more particularly, to the additional capability of locating potential witnesses in terms of other cell phone users, in response to certain cell phone-based 911 calls.

BACKGROUND OF THE INVENTION

Wireless telephones have received wide acceptance for use in cellular systems, as well as in wireless user premises equipment applications. There are new cellular telephone systems under development, as well as wireless personal communication systems (PCS) for both the licensed and unlicensed bands. A cellular telephone or cell-like communication system involves a network of fixed base stations that provide an integrated communication service to a plurality of mobile transmitter/receiver ("transceiver") units, e.g., cellular telephones. The communications network attempts to communicate with each transceiver from the base station that provides the optimal communication, such as in terms of signal level, clarity, etc. The optimal base station is usually, but not necessarily, the one nearest the mobile transceiver. To provide the optimal communications support, the network needs to locate the geographic position of the mobile only to the "rough" level required to assign the proper base station.

This rough estimate of the location of a mobile has been a hindrance in extending the conventional 911 aspect of communication service to the mobile environment. When a user makes an emergency 911 call on a standard corded telephone, the location of the user is quickly determined since the physical location of the telephone is known and unchanging. In contrast, cell phone callers can "roam" anywhere within the physical bounds of the entire system and, as result, "permanent" geographic location information associated with the cell phone is meaningless.

Based on this realization, the FCC has defined an "Enhanced 911" requirement which mandates that all wireless service operators must be able to provide geographic position data to Public Service Answering Positions (PSAPs) for E911 calls by October 2001. As a result of this mandate, wireless network operators connecting to the public switched telephone network must implement E911 service in two phases: Phase I stipulates that the system must pass the caller's phone number, cell-site, and cell-sector location information through to a PSAP. Carriers were to complete this step by April 1998, but many are still in the implementation stage. Phase II presents the more challenging task (at least from a location technology standpoint), of providing the 911 caller's location to the appropriate PSAP with an accuracy of 125 meters RMS (root-mean-square), in at least 67% of all cases. As most wireless operators proceed to fulfill Phase I requirements through their networks, they are also assessing which location technologies most effectively meet the Phase II requirements. These positioning methods are generally divided into two categories: (1) network-based systems that require some equipment installation at network base stations; and (2) handset-based systems that add GPS or another location technology to the wireless phone, but generally do not require additional network equipment.

Most network-based caller-location systems are based on time-difference-of-arrival (TDOA) or angle-of-arrival (AOA) measurements, or a combination of these two techniques. Cell-Loc provides one exemplary technology to determine the geographic position of mobile stations, as disclosed in U.S. Pat. No. 5,890,068, issued to M. T. Fattouche et al. on Mar. 30, 1999. In this case, receive-only antennas (ROAs) are located at base stations and TDOA measurements are made for various channel transmissions from mobile stations. This information is then used to determine the position of the devices, without requiring alterations to either the base stations or the mobile stations. In AOA technology, a set of receive-only phased array antennas are located at each base station and used to compute the angle at which signals transmitted from a mobile station arrive at the base station. See, for example, U.S. Pat. No. 5,786,791, entitled "Method for determining an angle of arrival of a signal transmitted by a remote unit in a communication system", issued to E. J. Bruckert on Jul. 28, 1998. A disadvantage of both of these techniques is that the geographic position of a mobile station can only be determined when the mobile station is transmitting. An enhancement to these network-based techniques, referred to as RF fingerprinting, measures the distinct RF patterns and multipath characteristics of radio signals arriving at a cell site from a mobile unit, using this information to determine the mobile's location with an additional level of granularity.

The FCC mandate clearly requires that wireless carriers be able to locate any caller requesting emergency assistance through its network. On the surface, this would appear to eliminate handset-based solutions, such as utilizing a Global Positioning System (GPS), from consideration since it would be essentially impossible to add GPS (or other location-sensitive components) to all phones operating on a network by October 2001. However, it is presumed that such a system could be phased in, with newer phones including the necessary technology. At a recent conference on wireless location system implementation, a Nokia representative reported that the company currently favors adding GPS to the handset as the best solution for caller location on CDMA networks. Ericsson has suggested a short-term solution based on TDOA and a long-term solution combining GPS in the phone with differential corrections, using a network server. In addition to manufacturing wireless phones, both Nokia and Ericsson supply wireless network infrastructure equipment. Lucent Technologies and Qualcomm, which also manufacture both wireless handsets and infrastructure equipment, report that they too are investigating long-term caller location solutions that include the addition of GPS to handsets. These wireless infrastructure suppliers generally favor GPS as an element of the long-term solution based on the view that aided-GPS will support a higher level accuracy will be needed to support a wide range of commercial location-based services. However, a number of major carriers continue to express a preference for a network-based solution.

Regardless of the technology ultimately deployed to provide the position location information of a mobile E911 caller, there are further aspects of this technology that may be deployed to provide additional features to such a system.

SUMMARY OF THE INVENTION

A need remaining in the prior art is addressed by the present invention, which relates to the provisioning of enhanced 911 service in a wireless communication environment and, more particularly, to the additional capability of locating potential witnesses in terms of other cell phone users, in response to certain cell phone-based 911 calls.

In accordance with the present invention, an off-line "position server" is added to the communication network and, upon receiving a request from a PSAP, will determine the identity and location of various other wireless communication devices in the vicinity of the 911 caller. Thus, in instances where it may be important to find witnesses (for an accident, a robbery, or the like), the stored location information associated with various other wireless devices in the network may be retrieved and those individuals contacted as potential witnesses.

In the practice of the present invention, an E911 agent at a PSAP will determine those calls which would benefit from "witness" information and then, on a case-by-case basis, launch a query to the position server to find and store this information (for later retrieval by the police, investigating entity, or other authorized individuals). The query includes a specific "radius" and time/date in the request, such as "find all cell phone callers within a two mile radius of latitude 29° E, longitude 110° N at 2PM EDT". Since the information regarding the capability to locate each wireless device is being developed, the ability to store and then retrieve this information will be helpful in identifying people that can assist in various emergency situations.

In one embodiment of the present invention, the position server itself may contain a database for storing the location information of all mobile stations in the communication system. In this case, the position server directly searches the database for the identity of mobile stations that would satisfy a particular search request from a PSAP, and stores the results in a table in the position server.

In an alternative embodiment, a network element (such as a gateway element between the wireless network and a traditional PSTN) may store the location information for a set of mobile stations that communicates through that particular gateway (also referred to, for example, as a mobile switching center). In this arrangement, when the position server receives a request from a PSAP to locate potential witnesses for a 911 call (referred to in this discussion as a "snapshot request"), the request is then forwarded to the relevant gateway elements that would be storing location information for mobile stations in the requested territory. Each gateway element then searches its own database and forwards the results to the position server, which then collects all of the incoming information and forms a "transaction table", for that particular "snapshot request", the table storing all of the relevant information associated with the mobile stations in the vicinity of the 911 call.

In yet another embodiment, each mobile station may be equipped with an internal location buffer for automatically determining and storing the location of the mobile station at any given time. In this arrangement, when the position server receives a "snapshot request", the request is again forwarded to the relevant gateway elements (e.g., mobile switching centers), which then broadcast the request to all mobile stations in its serving area. The mobile stations then check their current geographic location information against the location information in the request, and forward their unique identity information to the network element if they are indeed in the relevant area of the search.

Other and further embodiments of the present invention will become apparent during the course of the following discussion and by reference to the accompanying drawings.

BRIEF DESCRIPTION OF THE DRAWINGS

Referring now to the drawings,

FIG. 7 illustrates an exemplary table for storing current mobile station location data in accordance with the present invention;

FIG. 13 is an exemplary table that may be used by a mobile switching center to store the location information received from the plurality of mobile stations in its serving area;

FIG. 16 comprises a database of relevant identification information for all mobile switching centers in the communication network, stored in the position server;

DETAILED DESCRIPTION

Figure 1:
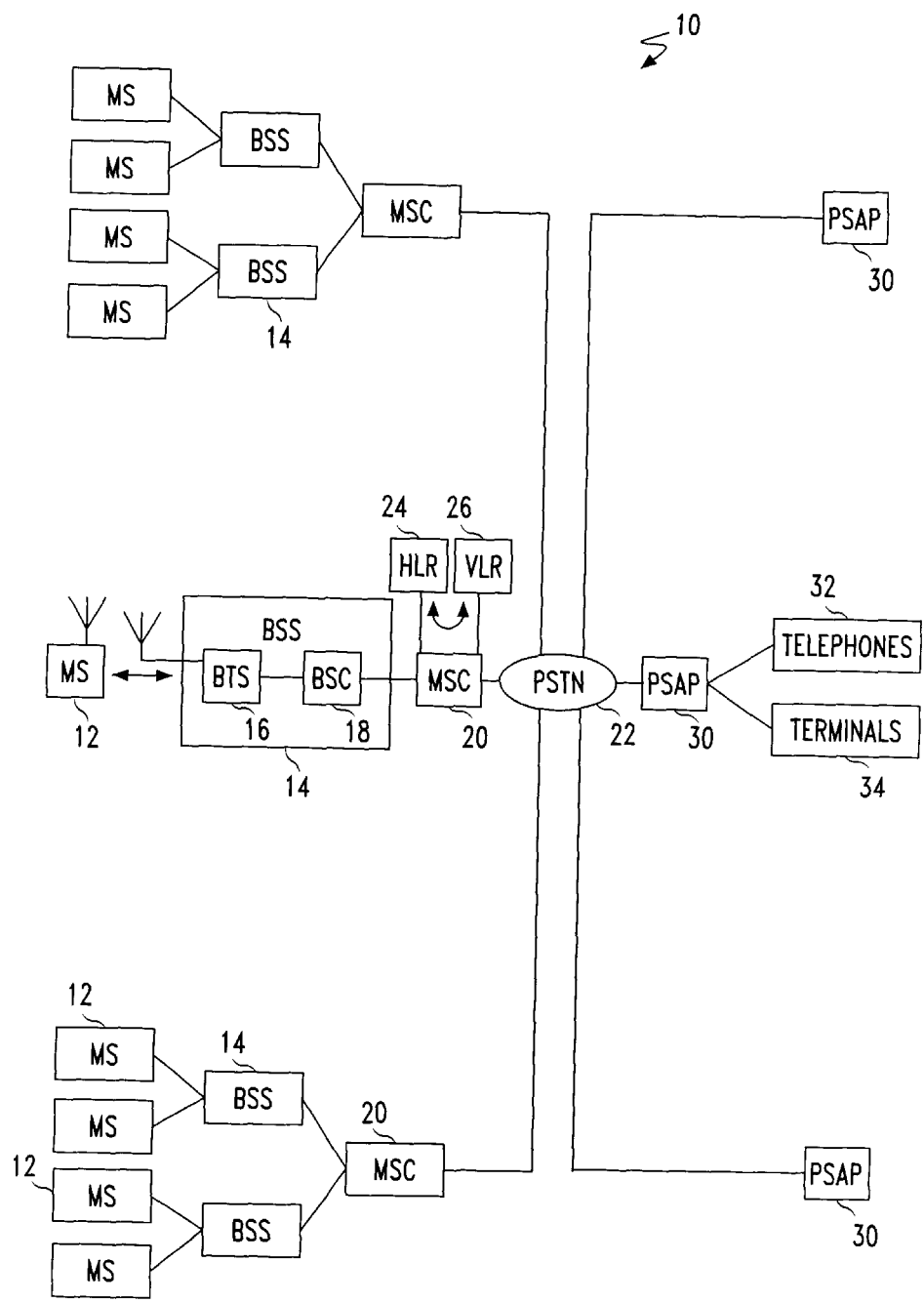
FIG. 1 illustrates, in simplified block diagram form, an exemplary prior art Global System for Mobile Communication (GSM) that may be modified to incorporate the teachings of the present invention.

FIG. 1 illustrates an exemplary prior art Global System for Mobile Communications (GSM) network 10 that is useful to understand prior to discussing the implementation of various embodiments of a "witness locator" service in accordance with the present invention. As shown, a plurality of mobile stations 12 are dispersed throughout the network, where various subsets of stations 12 are in communication with a plurality of base stations subsystems 14. One exemplary base station subsystem 14 is shown in slightly more detail as comprising a base transceiver station 16 and a base station controller 18. It is to be understood that each base station subsystem 14 includes similar components. As shown in FIG. 1, base station controller 18 is in communication with a mobile switching center 20, where a plurality of mobile switching centers 20 function as gateway elements between the wireless communication system and a conventional telecommunications network 22, such as the Public Switched Telephone Network (PSTN). Associated with each mobile switching center 20 is a "home" location register 24 and a "visitor" location register 26, which communicate with each other to keep track of the various mobile units 12 (each mobile comprising a unique ID) and whether the particular mobile switching center 20 is their "home" center 20 or, alternatively, whether that particular mobile unit has roamed and is therefore "visiting" another switching center 20.

Further illustrated in network 10 of FIG. 1 is a plurality of Public Safety Answering Positions (PSAPs) 30, used to respond to 911 calls placed by the mobile devices 12. Each "position" at a PSAP location may include both telephones 32 and computer terminals 34, to aid the agents manning PSAPs 30 in responding to received distress calls. The architecture of network 10, as illustrated in FIG. 1, can be considered as the current state of the art in terms of the interaction of the components and the ability of a PSAP 30 to respond to a 911 call placed by a mobile station 12.

Figure 2:
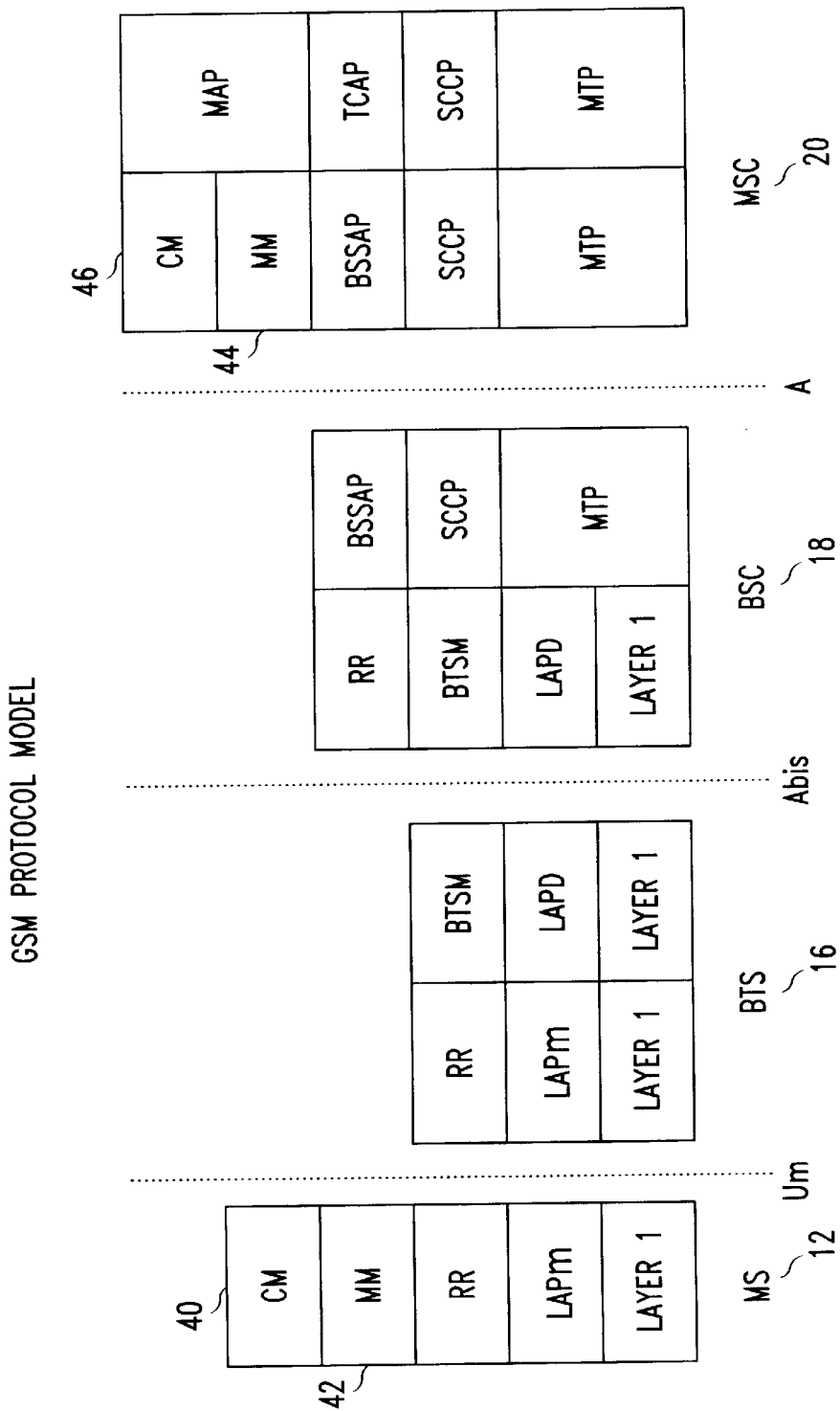
FIG. 2 is a diagram of the protocol stack associated with the GSM system of FIG. 1.

The various protocols used to communicate throughout GSM network 10 are illustrated in the model of FIG. 2. Included within the protocol stack 40 at mobile station 12 is a "mobility management" protocol 42, where MM protocol 42 can be enhanced, in accordance with the present invention, to transmit the geographic location of mobile station 12 to its mobile switching center 20 (see MM protocol 44 within protocol stack 46 associated with mobile switching center 20). MM protocol 42 is primarily concerned with location, registration and security information. Conventional location updating occurs when mobile station 12 beings a new call. Periodic location updating happens at regular intervals, where the main purpose of MM protocol 42 is to maintain the integrity of the "home" and "visitor" location registers 24 and 26, respectively. In particular, a "Location Updating Request" message is transmitted from a given mobile station 12 to its associated mobile switching center. 20. In accordance with the present invention, this Location Updating Request message is enhanced to contain the geographic position (viz., latitude, longitude) of mobile station 12.

Figure 3:
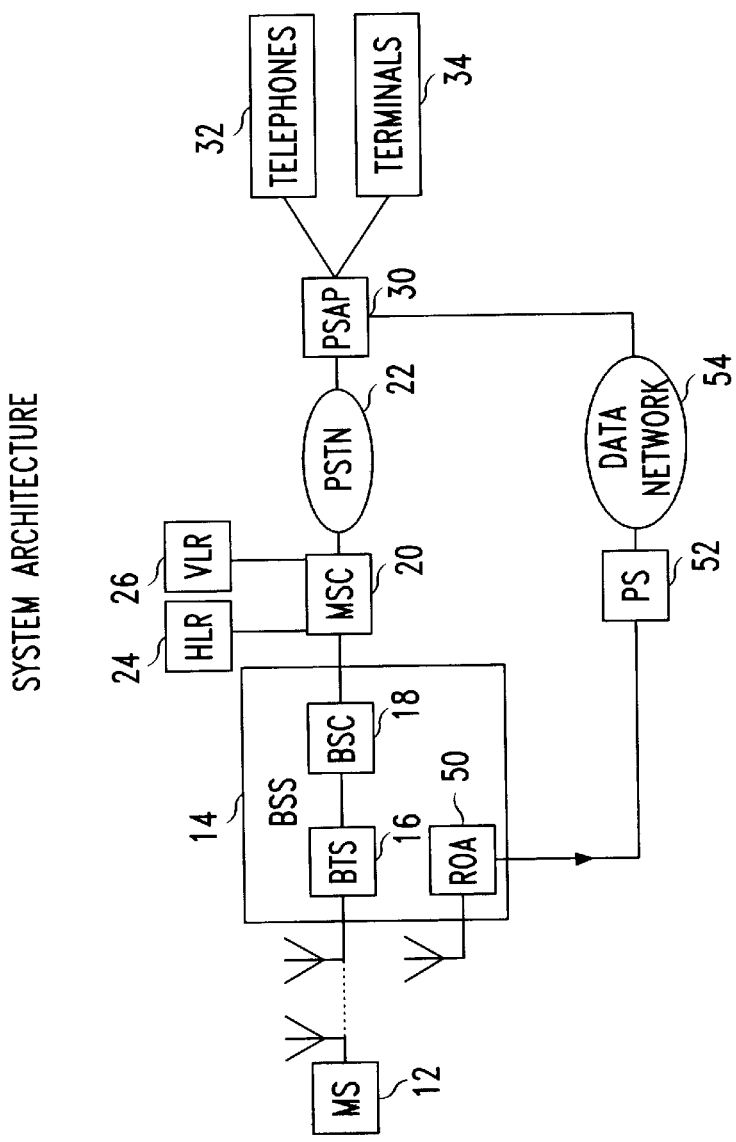
FIG. 3 illustrates a portion of the GSM network that has been modified to include a first embodiment of the present invention, utilizing receive-only antennas to assist in locating witnesses to an E911 call from a mobile station.

FIG. 3 illustrates a portion of an exemplary GSM network that has been modified to include the capability of identifying potential witnesses for various emergency situations, in accordance with the present invention. As shown in this particular embodiment, base station subsystem 14 has been modified to include a receive-only antenna 50, co-located with base transceiver station 16 so as to simultaneously receive each transmission from each mobile station 12 in communication with that particular base station subsystem 14 (it is to be noted that each base station subsystem 14 in the network is similarly modified to include such a receive-only antenna 50). An exemplary transmission, in accordance with the GSM protocol model, will include (among other pieces of information) the particular cell phone number associated with transmitting mobile station 12 and its current location. Base transceiver station 16 uses this information in the normal fashion to facilitate communication between mobile station 12 and its desired receiving station (not shown). Receive-only antenna 50 collects this same information and forwards it to a position server 52. As will be discussed in detail below, position server 52 functions to store the geographic position of the last transmission for each mobile station 12 associated with base station subsystem 14, and then use this information to respond to "snapshot requests" from a PSAP regarding the identity of potential witnesses for a particular 911 call.

In accordance with the present invention, when an agent at a PSAP 30 believes that it would be useful to capture potential witness information for a particular 911 call, the agent will launch a query, through a data network 54, to position server 52, requesting position server 52 to collect the identity of all cell phones whose last-recorded geographic distance is within a certain boundary of the geographic location of the 911 caller (the boundary, usually defined by a radius surrounding the origination site of the 911 call, can be defined by the 911 agent). The information collected by position server 52, in response to this query, may then be stored as an identifiable table within position server 52. Later on, the police (or any other authenticated investigative agency) can retrieve the information and contact the individuals associated with the cell phone numbers that were collected. For example, if a "hit and run" car accident occurred at a particular intersection, the PSAP agent can launch a query to position server 52, requesting position server 52 to "snapshot" all cell phones within two blocks of the scene of the accident, during the time of the accident. Such a request may result in, for example, a response that ten different cell phones were in use in the vicinity of the accident. The police can then contact the individuals associated with these cell phones to determine if any of them witnessed the accident and can supply any details to aid in the investigation.

Figure 4:
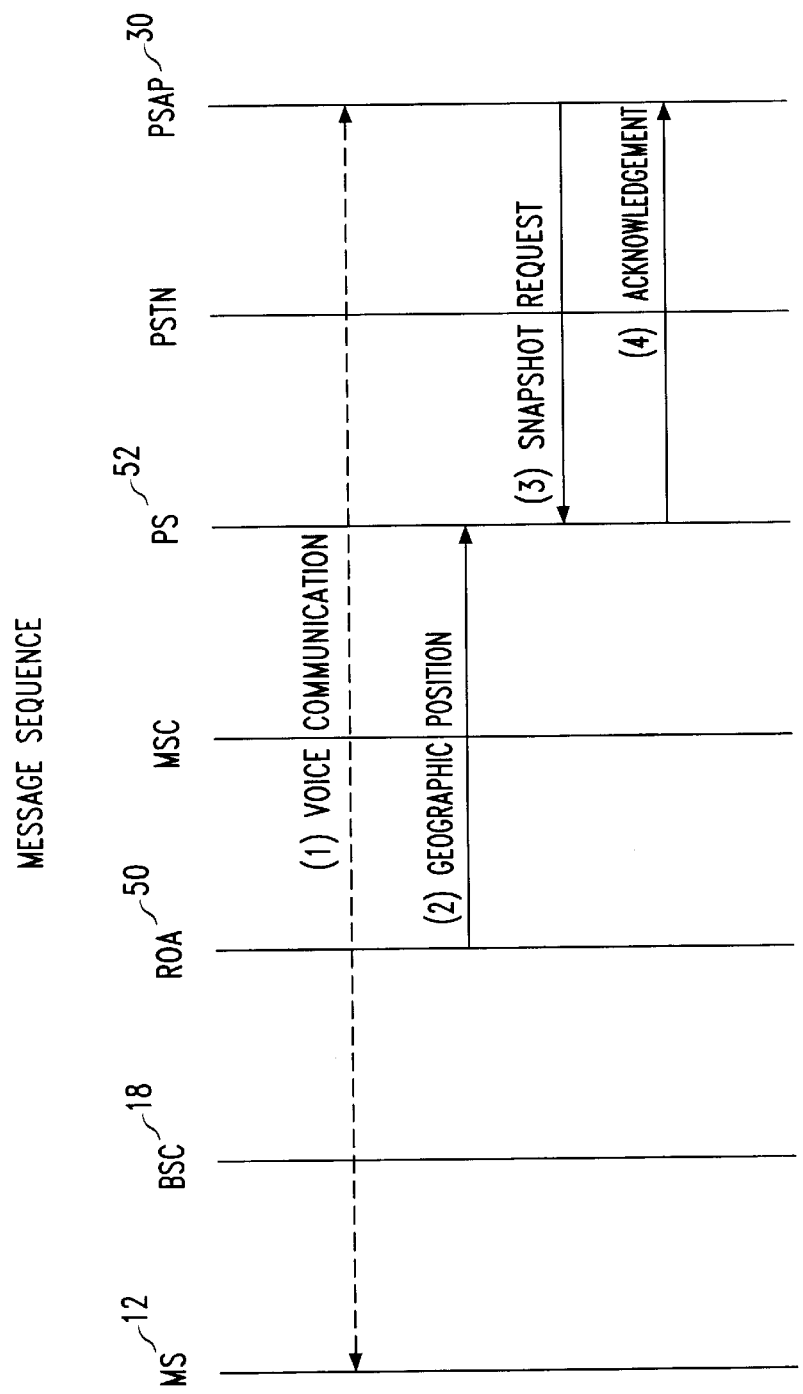
FIG. 4 contains an exemplary message sequence associated with the implementation of the present invention in the network of FIG. 3.

FIG. 4 illustrates the message sequence associated with the communication steps described thus far. As shown in line "1", a "voice communication"—in this case, a 911 call, is first established between a given mobile station 12 and a PSAP agent 30. At the same time, the positional information related to mobile station 12 is recovered by receive-only antenna 50 (co-located with base station controller 18) and transmitted to position server 52, denoted as line "2" in FIG. 4. In a preferred embodiment, the message format for such a "geographic position" message would include the following information: (1) telephone number of the mobile station; (2) latitude; (3) longitude; and (4) time. When and if the agent at PSAP 30 determines that it would be useful to learn the identity of other cell phone users in the vicinity of a 911 call in progress, PSAP 30 will launch a "snapshot request" query to position server 52 (line "3" in FIG. 4), where this query may have the format of: (1) telephone number of 911 caller; (2) telephone number of 911 agent; (3) latitude of 911 caller; (4) longitude of 911 caller; (5) radius of requested search. In return, position server 52 will acknowledge receipt of the request back to PSAP 30 (line "4" in FIG. 4), the acknowledgement carrying a unique snapshot ID for this request.

Figure 5:
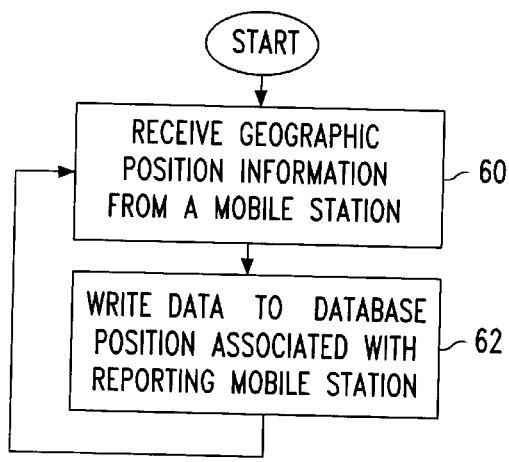
FIGS. 5 and 6 contain flowcharts illustrating the function of an exemplary position server in the working of the present invention.
Figure 6:
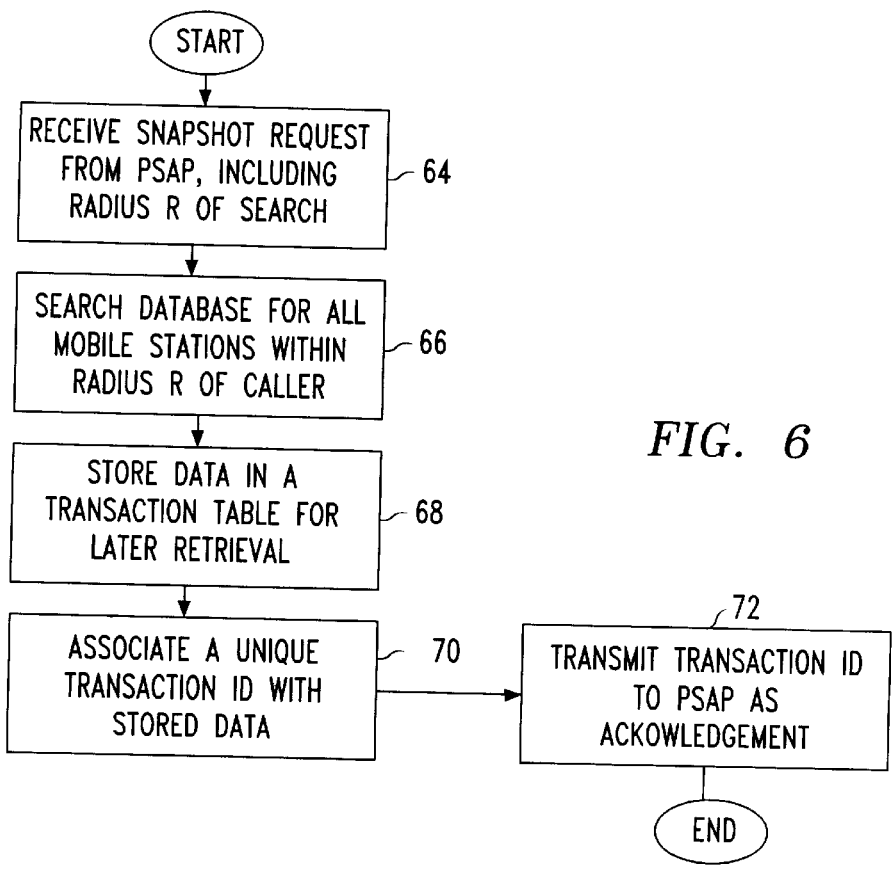

FIGS. 5 and 6 contain flowcharts illustrating the two different functions of an exemplary position server 52. FIG. 5 shows, in particular, the steps associated with updating the current position information of an exemplary mobile station 12. When the process first starts, "geographic position" information (as defined above) is received from mobile station 12 (block 60). The particular portion of the data base associated with this mobile station is found, and the data stored (block 62). FIG. 7 illustrates an exemplary table for storing this data. In this particular arrangement, the stored data comprises the telephone number, date and time of the geographic position measurement and the latitude and longitude of the mobile station location.

Figures 8, 9:
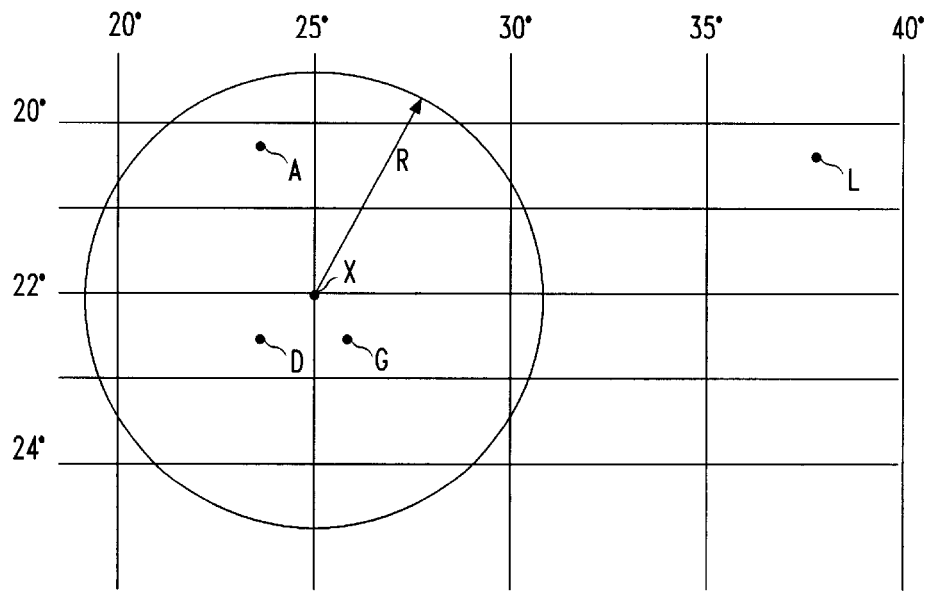
FIG. 8 contains a graphical illustration of an exemplary "witness location" "snapshot request" performed in accordance with the present invention.
FIG. 9 is an exemplary "transaction table" of all identified mobile stations (i.e., potential witnesses), as being within a defined boundary of a particular 911 call.

Referring to FIG. 6, the flowchart associated with the process of PSAP 30 querying a position server 52 is shown. The process begins with receiving a "snapshot" request at position server 52 (block 64). As discussed above, the snapshot request will include the particular radius R the server should use in conducting its search, the radius being determined by the PSAP agent. The request will include the current latitude and longitude of the 911 caller (or other geographic location identifying information), and will be used by position server 52 to determine the boundaries for the search (using the 911 caller location as the center point). Position server 52 will then search through the table as shown in FIG. 7, looking for all reporting mobile stations within the determined boundaries (block 66). FIG. 8 illustrates graphically one such request, where a mobile station 12 (denoted "X") placing the 911 call, with telephone number XXX-YYY-ZZZZ, is used as the center point, and all mobile stations within radius R are found. Three such mobile stations, designated A, D, and G are illustrated as falling within this radius, with another mobile station, designated L, being beyond the designated boundary. Once mobile stations are identified, the pertinent information about these stations is copied into a "transaction table", such as the table illustrated in FIG. 9 (block 68). Upon completion of the table, a "transaction ID", unique to that request, is created (block 70) and transmitted back to PSAP 30 (block 72) as an acknowledgement that the request has been completed. At a later time, the police or other investigators may retrieve this information from position server 20, using the transaction ID stored at PSAP 30, and contact the potential witnesses using the stored mobile station telephone numbers.

Figure 10:
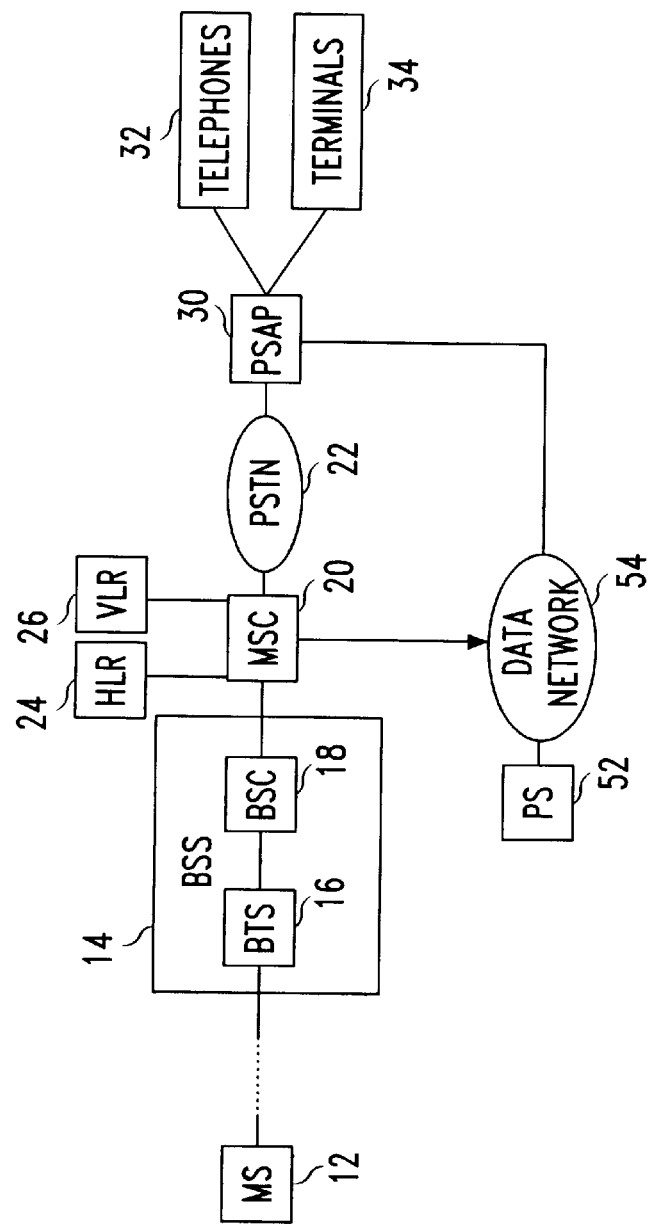
FIG. 10 illustrates an alternative embodiment of the present invention, utilizing a network element, such as a mobile switching center, to store geographic location information for a plurality of mobile stations.

FIG. 10 illustrates an alternative embodiment of the present invention, where in this case each mobile station 12 automatically updates its position, storing this information at its associated mobile switching center 20. This arrangement utilizes a conventional signaling message through base station subsystem 14 without the need for an additional; receive-only antenna at subsystem 14. In one example, a system such as GPS can be used to update the position of each mobile station 12. Referring back to FIG. 2, mobility management (MM) protocol 42 as used by mobile station 12 may be enhanced to provide this location information. Currently, the MM protocol is concerned with information related to location, registration and security. Standard location updating occurs in the prior art when the mobile station moves to a new cell, with periodic location updates at regular intervals. This use of the MM protocol is helpful in maintaining the integrity of HLR database 24 and VLR database 26. In use, a "location updating request" message is transmitted from mobile station 12 to mobile switching center 20. In accordance with the present invention, the "location updating request" message is enhanced to include geographic information (for example, latitude and longitude).

Figure 11:
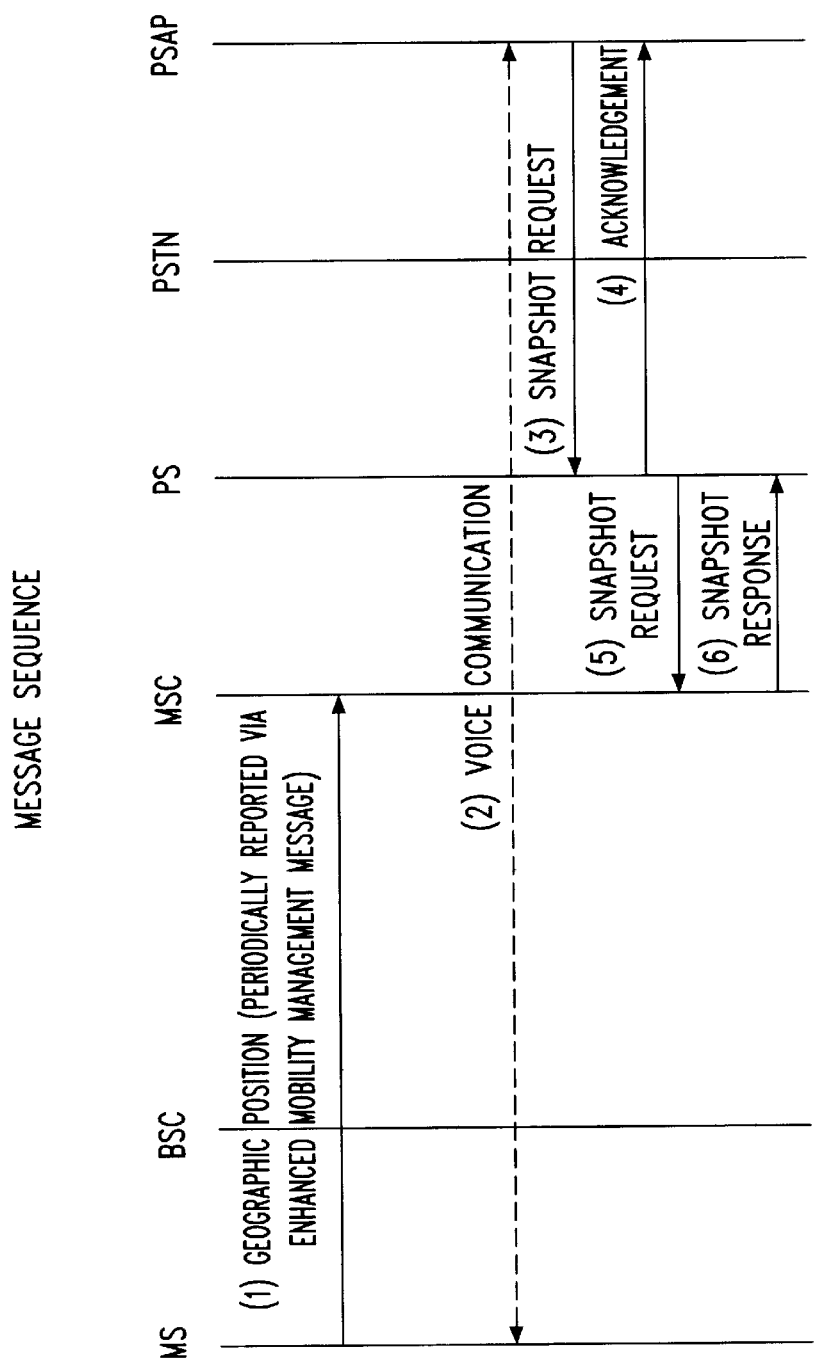
FIG. 11 illustrates a particular message sequence associated with the network architecture of FIG. 10.

Referring now to both FIGS. 10 and 11, the message sequence associated with this embodiment will be described in detail. An aspect of this embodiment of the present invention is that the "location update" of the geographic position of a mobile happens separately and independent of any voice communication traffic between the mobile station and the communication system. FIG. 11 illustrates as message sequence (1) a "geographic position" update being sent directly from a mobile station 12 to its associated mobile switching center 20. At a later point in time, a voice communication (911 call) is initiated by mobile station 12, illustrated as message sequence (2) in FIG. 11. As with the embodiment described above, this communication is received by an agent at a PSAP 30. When and if the PSAP agent determines that it would be useful to find "witnesses" in the area of the 911 call, the agent launches a "snapshot request", through data network 54, to position server 52 (message sequence (3) in FIG. 11). In a preferred embodiment, the "snapshot request" message format includes the following information: (1) telephone number of the 911 caller; (2) latitude of the 911 caller; (3) longitude of the 911 caller; (4) radius, R, of search zone; and (5) telephone number of the 911 agent. At this point, the process sequence is essentially identical to that described above. However, in this arrangement position server 52 does not store the geographic information. Therefore, position server 52 will send an acknowledgement (message sequence (4)) back to PSAP 30 that the request has been received and assigned a unique transaction ID. Position server 52 will then send a copy of the snapshot request (along with the transaction ID) to one or more mobile switching centers 20 through data network 54 (message sequence (5) in FIG. 11). The number and identity of the particular mobile switching centers that are queried depends upon, among other things, the geographic location of mobile station 12 placing the 911 call, as well as the radius, R, of the search request entered by the agent at PSAP 30. The identity of all mobile stations satisfying the request will be sent as a "snapshot response" message (message sequence (6)) to position server 52, where position server 52 will hold this information until later accessed by the authorized agencies requesting such information.

Figure 12:
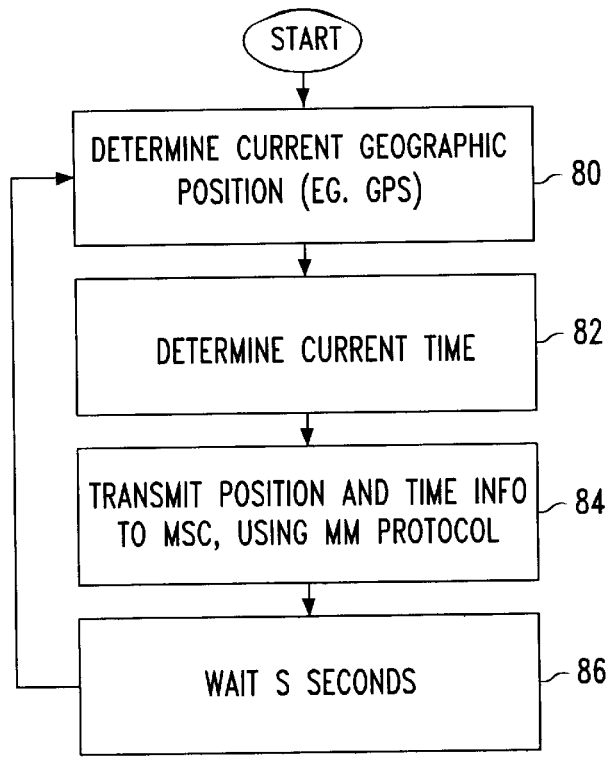
FIG. 12 contains a flowchart of the process used by a mobile station to send its geographic location information to its associated mobile switching center.

As mentioned above, this particular embodiment envisions the use of mobile stations that can constantly update their geographic location information, regardless of whether or not the mobiles are currently involved in an on-going voice communication session. FIG. 12 contains a flowchart illustrating the process used by an exemplary mobile station 12 to provide this information. In one embodiment, each mobile station may be equipped with a GPS transmitter so as to automatically update its geographic location information. Referring to FIG. 12, the process begins with mobile station 12 determining its current geographic position (block 80). In an exemplary embodiment, the mobile's latitude and longitude information may be used to define its geographic location. Next, the current time is determined (block 82). Mobile 12 station then inserts this information into the "mobility management" (MM) protocol 42 and transmits this information upstream to its associated mobile switching center 20 (block 84). Mobility switching center 20 then checks the identity of the sending mobile station 12 and updates the geographic information in its database. An exemplary table useful for storing this geographic information at mobility switching center 20 is shown in FIG. 13. In particular, the table stores the identity of each mobile station 12 associated with mobility switching center 20, along with the geographic location information (such as latitude and longitude) and the data and time the last update was performed. This information can be refreshed at predetermined intervals. For example, referring again to the flowchart of FIG. 12, the mobile station will "wait" for a period of S seconds (block 86), as determined by either the mobile or the communication system, and then re-determine its geographic location information (i.e., the process returns to block 80), again transmitting the updated information to mobile switching center 20.

Figure 14:
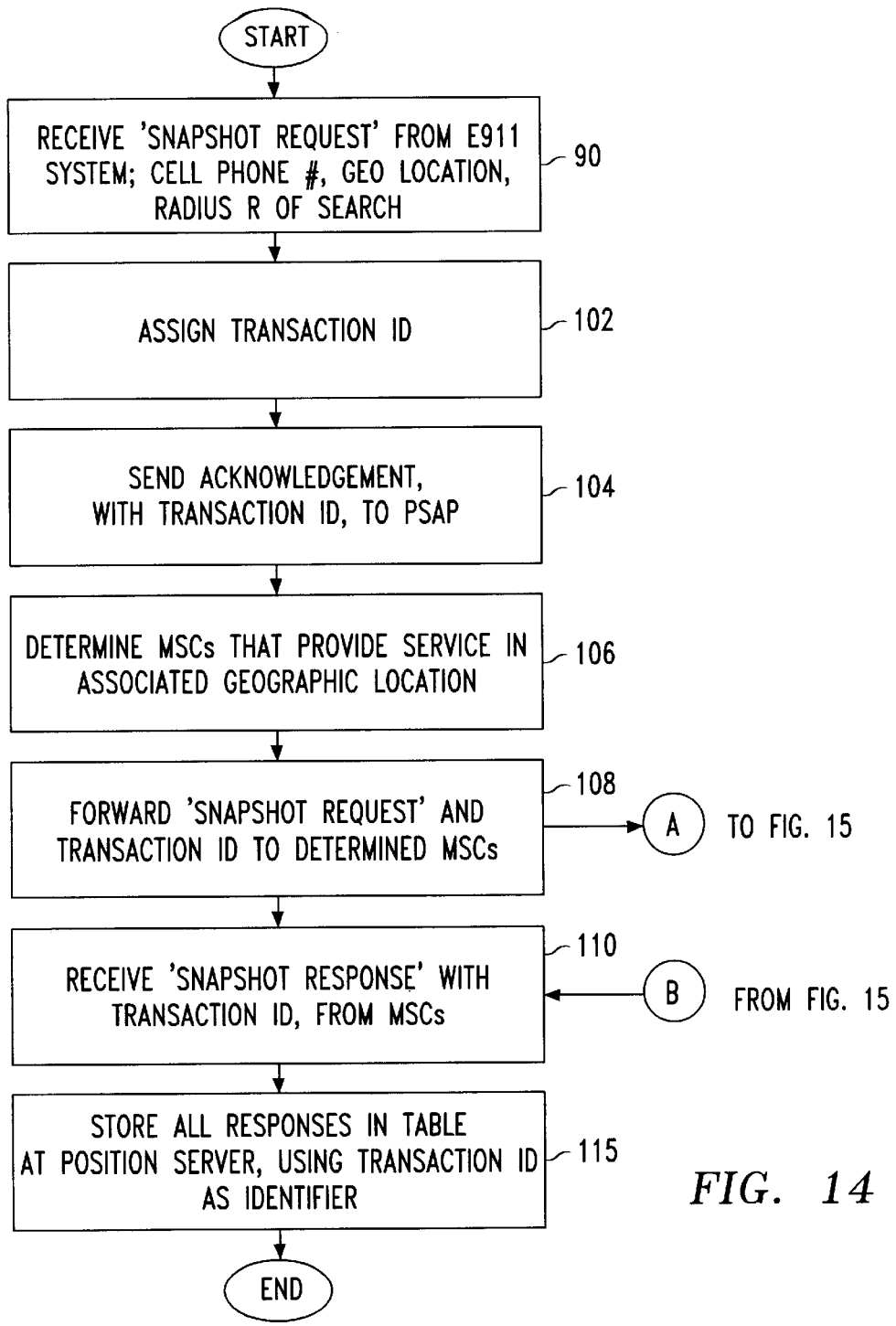
FIG. 14 contains a flowchart of a position server process for responding to a "snapshot request" from a PSAP.

FIG. 14 contains a flowchart illustrating the process of responding to a "snapshot request" from the viewpoint of an exemplary position server 52. As shown, the process begins with a PSAP 30 transmitting a "snapshot request" over (for example) data network 54 to position server 52 (block 90). The request comprises the format discussed above, including the necessary cell phone numbers as well as the geographic location of the 911 caller. Position server 52 then assigns a unique transaction ID to the request (block 102), and transmits this transaction ID as an acknowledgement to PSAP 30 (block 104).

Position server 52 next determines the mobile switching center (or centers) 20 that would likely cover the geographic area associated with this snapshot request (block 106), and forwards a copy of the "snapshot request", with the transaction ID, to each relevant mobile switching center (block 108) 20. This step is also denoted with an "A" in FIG. 14, and refers to the flowchart in FIG. 15, discussed below, which includes the sequence of operations at a queried mobile switching center 20. Continuing on with the description of FIG. 14, the collected data regarding potential witnesses is returned as a "snapshot response" message from each queried mobile switching center 20 (block 110), denoted with the letter "B" in FIG. 14. The received information is then stored in a "snapshot table" at position server 20 (block 115), such as the table illustrated in FIG. 9 and discussed above with the prior embodiment. Besides this database, and a database of all outstanding "snapshot requests", position server 52 includes a database of relevant information about each mobile switching center 20 with which it may communicate. One such exemplary database is illustrated in FIG. 16, which includes identification information for each mobile switching center 20, its network address and geographic information that can be used to "bound" the coverage area of the mobile switching center. In this example, the "corner" latitude and longitude information is recorded (i.e., the "northwest", "southwest", "northeast", and "southeast") and used to define the geographic boundaries.

Figure 15:
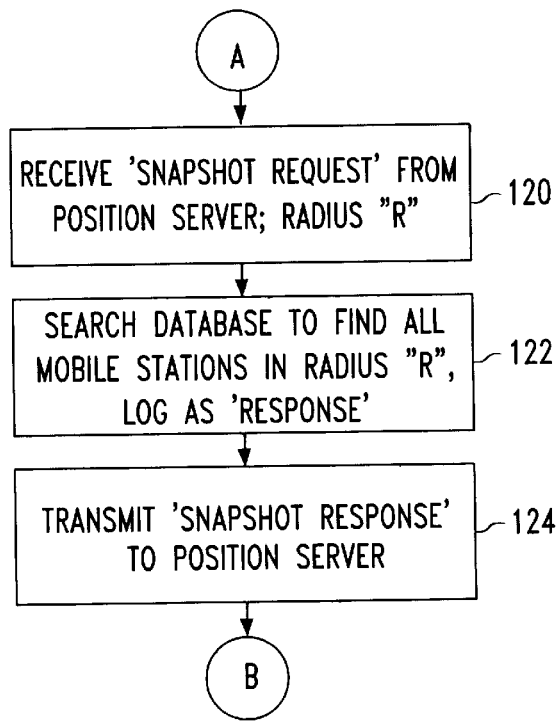
FIG. 15 contains a flowchart of the mobile switching center process for responding to a "snapshot" request from the position server.

The process at each mobile switching center 20, as depicted in FIG. 15, begins with the reception of the "snapshot request" message from a position server (block 120). Mobile switching center 20 then performs a check through each entry in its database, using the geographic location and radius information in the request, to identify all mobile stations in the desired vicinity (block 122). The identity and geographic information associated with each mobile station satisfying the search criteria is then sent as a "snapshot response" message (block 124) back to mobile switching center 20.

Figure 17:
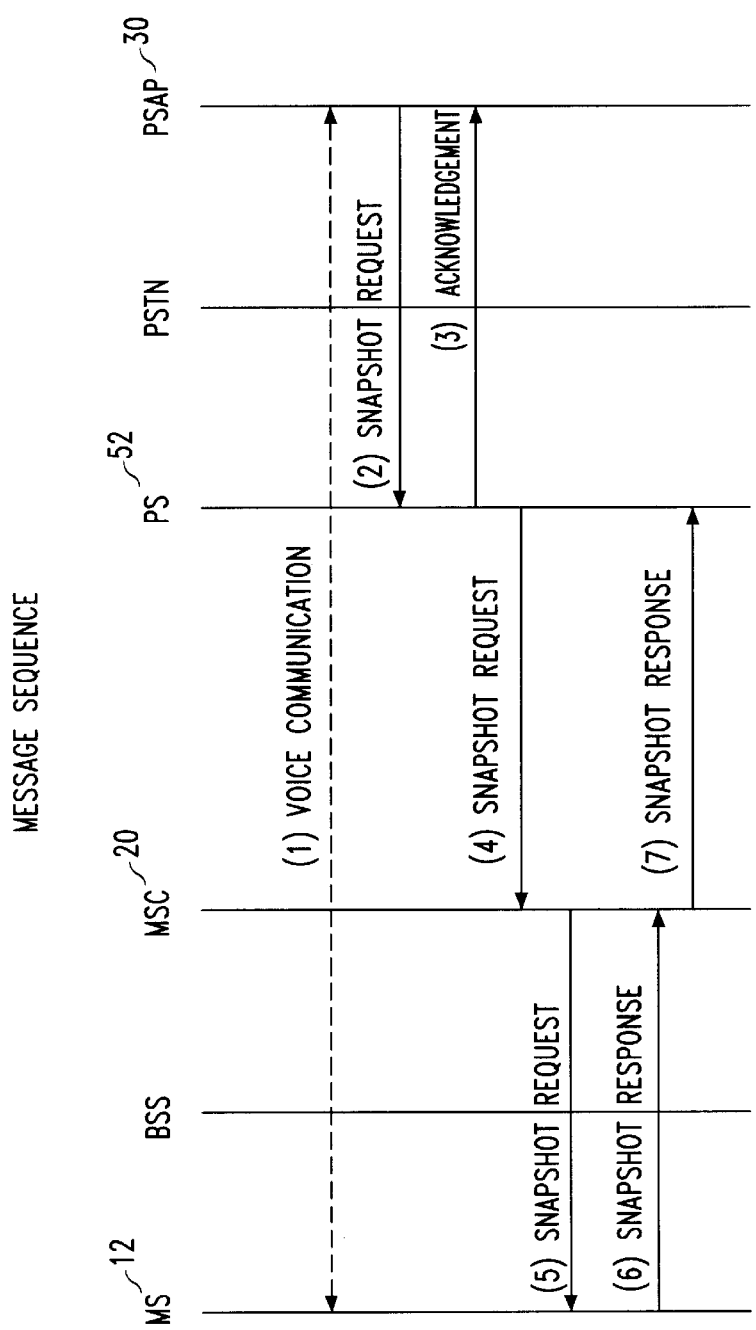
FIG. 17 illustrates an exemplary message sequence associated with an alternative process where each mobile station stores its current location in an internal buffer.

As an alternative to the process used with the architecture of FIG. 10, each mobile station 12 may periodically determine its geographic location and store this information (and the time of the recording) in an internal circular buffer within mobile station 12 itself. The circular buffer is preferably formed to include a plurality of N registers, and is therefore capable of storing a history of the last N locations of mobile station 12. Thus, as new location information is written in the circular buffer, the "oldest" information is discarded. FIG. 17 depicts an exemplary message sequence associated with this arrangement. As before, the process starts with a particular mobile station 12 making a 911 to a PSAP 30 (message sequence (1)). The agent at PSAP 30 determines that it would be valuable to identify witnesses associated with this 911 call, and sends a "snapshot request" (message sequence (2) to position server 52. The format of this "snapshot request" is the same as that discussed above with the other embodiments. Position server 52 then sends an "acknowledgement" (message sequence (3)), including a unique transaction ID, back to PSAP 30, and at the same time forwards the "snapshot request" to one or more mobile switching centers 20 (message sequence (4)), in the manner discussed above.

In contrast to the previously discussed embodiment, in this case each mobile switching center 20 then broadcasts the snapshot request to all mobile stations 12 in its coverage area (message sequence (5)). Each mobile station 12 then searches its own circular buffer and determines, using the time, geographic location information, and radius of search, if it was within the requested witness area. If so, it waits a random amount of time and then forwards its identifying information as a "snapshot response" to mobile switching center 20 (message sequence (6)). By including a random delay in the response, there is an increased assurance that mobile switching center 20 will receive all "snapshot response" messages without overloading the system and blocking some response messages. Once all of the responses have arrived, mobile switching center forwards this information as its "snapshot response" message (message sequence (7)) to position server 52.

Figure 18:
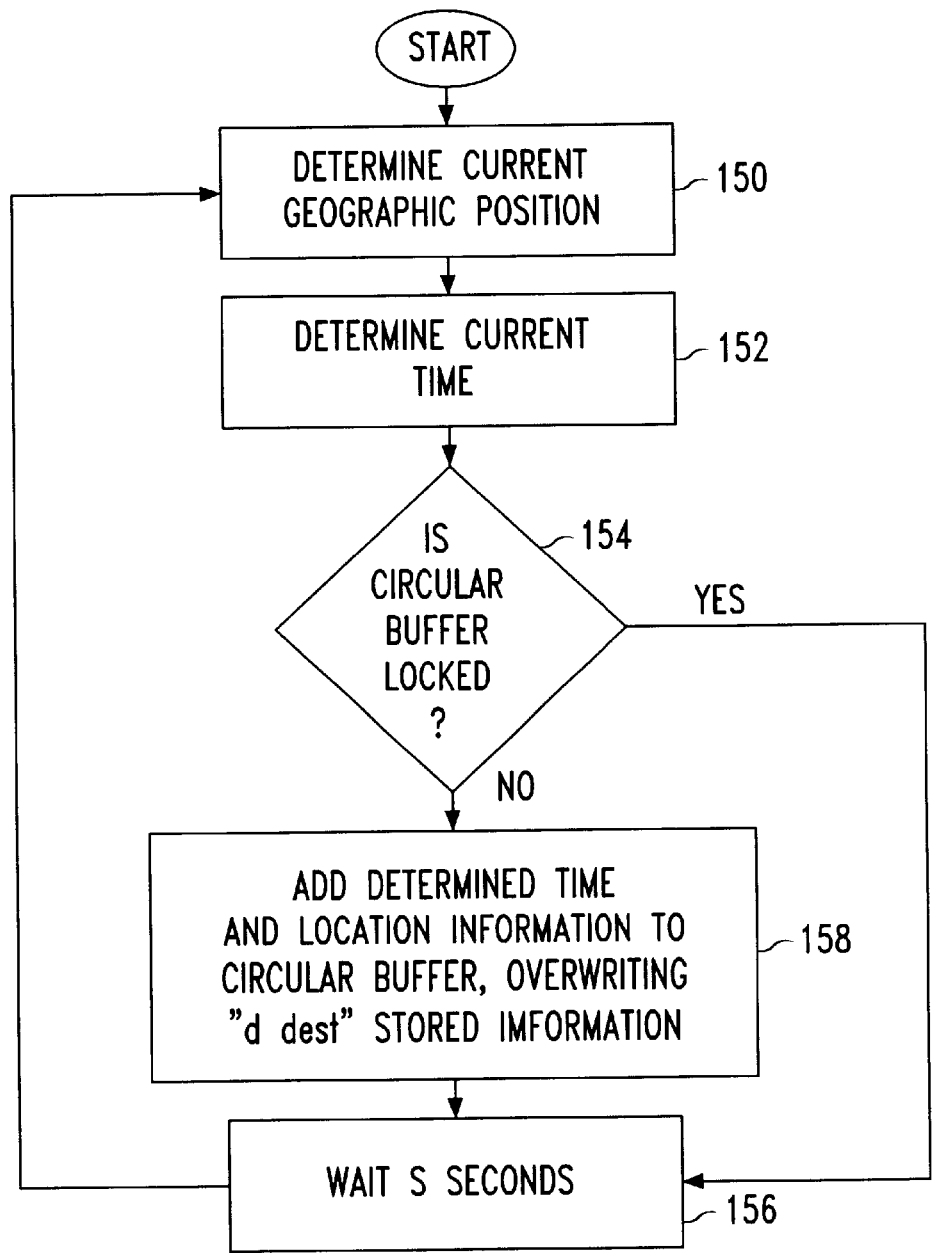
FIG. 18 is a flowchart of a process for updating the location information at a mobile station.
Figure 19:
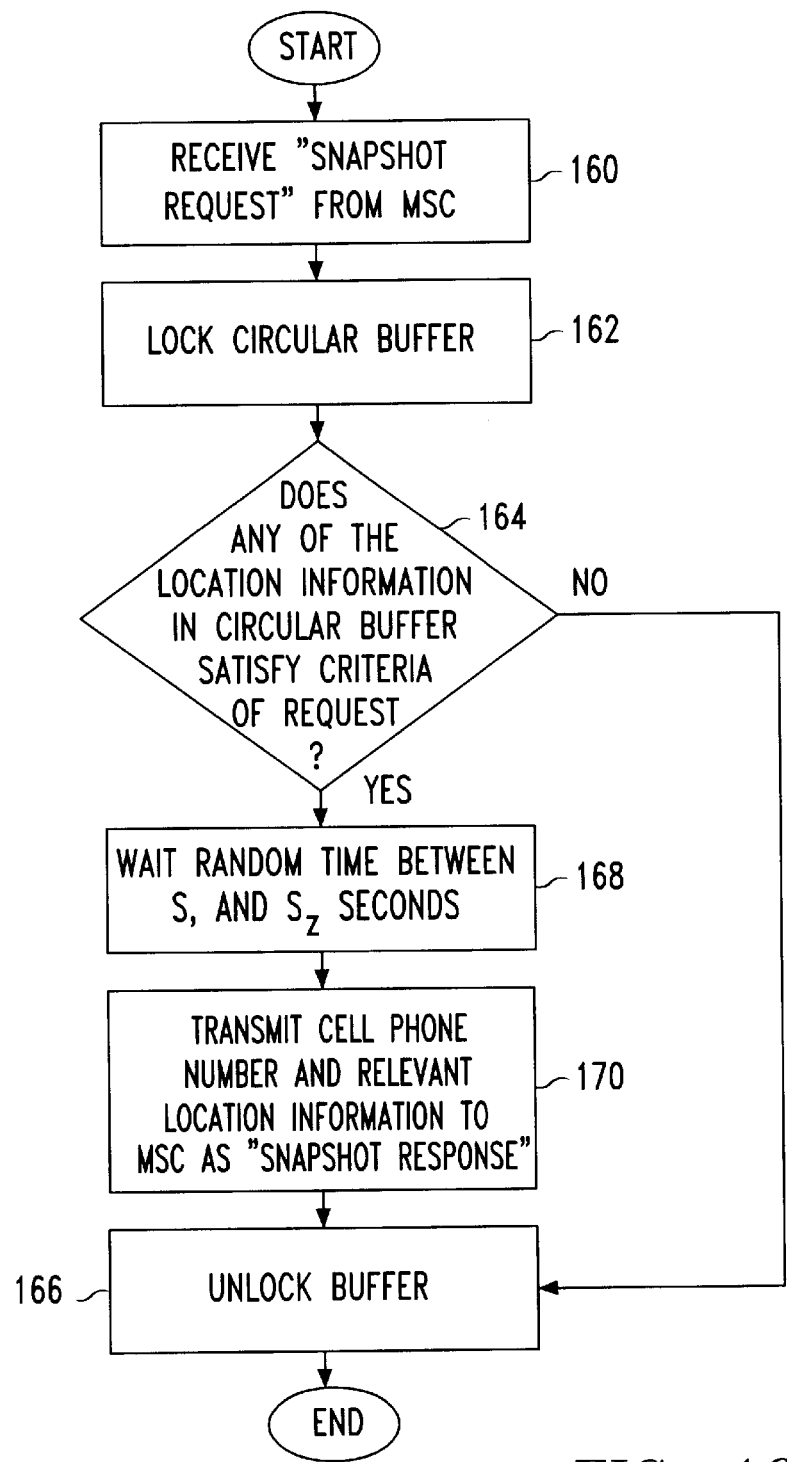
FIG. 19 is a flowchart of a process used by a mobile station to respond to a "snapshot request" broadcasted by a mobile switching center.

Flowcharts illustrating the particular processes occurring within mobile station 12 for this embodiment are shown in FIGS. 18 and 19. In particular, FIG. 18 illustrates an exemplary set of process steps associated with the process of updating the geographic location of an exemplary mobile station 12. The process begins (block 150) with mobile station 12 determining its current geographic position. Any appropriate arrangement for providing such a location feature may be used, such as, for example, the Global Positioning System (GPS). Mobile 12 then accesses an internal clock to determine the current date and time (block 152). Before writing this updated location, date and time information into its circular "location" buffer, a check is determined to see if the circular buffer is "locked" (step 154), meaning that the data has been frozen and permission to overwrite the data has been denied. As will be discussed below, the buffer information is "locked" upon receipt of a "snapshot request" by mobile station 12. If indeed the buffer is locked, the process will jump to block 156, wait S seconds and go back to step 150 and re-determine its current position. If the buffer is not locked, the collected location, time and data information is sent to the mobile's "location" buffer and overwrites the oldest stored location information (block 158).

The process used by a mobile station 12 in responding to a broadcasted "snapshot request" is contained in the flowchart of FIG. 19. As shown, the process begins by the receipt of the "snapshot request" at mobile station 12 (block 160). When a request is received, mobile station 12 then "locks" its location buffer (block 162) to prevent further updates from occurring (insuring that the current location information stored in its buffer would be most relevant to the "snapshot request"). After locking the circular buffer, a query is made to determine if any of the information stored in the buffer satisfies the "snapshot request" in terms of the queried "time" and "radius" of the search around a certain geographic location (block 164). If the stored information does not satisfy the criteria of the "snapshot request", the location buffer is unlocked (block 166), and the process ends. If the stored information does satisfy the request, then mobile station 12 "waits" a random time interval between $S_1$ and $S_2$ seconds (block 168), and then transmits its identity and relevant location information back to mobile switching center 20 (block 170). The inclusion of a random delay before responding minimizes the chance of overloading both base station subsystem 14 and mobile switching center 20 with the responses from multiple mobile stations. Once this information has been transmitted, the mobile's buffer is unlocked (block 166), and the process ends.

While there have been illustrated and described what are considered to be preferred embodiments of the present invention, it will be understood by those skilled in the art that various changes and modifications can be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the claims appended hereto.

What is claimed is:

1. In a mobile communication system, an arrangement for identifying and collecting relevant witness information associated with a 911 call from a mobile station, the system comprising a plurality of base station subsystems for receiving voice communications from mobile stations;

a plurality of mobile switching centers, each responsive to communications from a subset of said plurality of base station subsystems;

at least one public safety answering position, coupled to the plurality of mobile switching centers through a communication network;

a position server coupled to the at least one public safety answering position through a data network, said position server for collecting geographic location information of other mobile stations in a predetermined area surrounding the geographic location of a mobile station placing a 911 call and storing the information regarding each identified mobile station near the geographic location of that call in a transaction table, wherein each base station subsystem includes a receive-only antenna for collecting geographic position information from each transmitting mobile station and forwarding the geographic position information directly to the position server for storage in a geographic location database.

2. A communication system as defined in claim 1 wherein each mobile station forwards its geographic location information to its associated mobile switching center, the plurality of mobile switching centers being connected through the data network to the position server and the position server including a table identifying each mobile switching center and its coverage area, such that upon receiving a request for information the position server queries relevant mobile switching centers which then forward the identity and location of all mobile stations which meet the search criteria.

3. A communication system as defined in claim 2 wherein each mobile station sends its geographic location information to its associated mobile switching center when transmitting.

4. A communication system as defined in claim 2 wherein each mobile station sends its geographic location information to its associated mobile switching center at predetermined time intervals, whether or not engaged in communication.

5. A communication system as defined in claim 1 wherein each mobile station includes a buffer for storing its own geographic location information such that when the position server receives a request for information the request is forwarded to relevant mobile switching centers to broadcast to all its associated mobile stations and then collect the relevant information.

6. A communication system as defined in claim 1 wherein the stored geographic location information is derived using a time difference of arrival calculation method.

7. A communication system as defined in claim 1 wherein the stored geographic location information is derived using an angle of arrival calculation.

8. A communication system as defined in claim 1 wherein the stored geographic location information is derived using an RF fingerprinting method.

9. A communication system as defined in claim 1 wherein the stored geographic location information is derived using a global positioning system.

10. A method of determining the identity of mobile stations in a communication network that are in a predetermined vicinity of a 911 call from a mobile station, the method comprising the steps of:

a) determining, at a public safety answering position, that a 911 call in progress requires witness identification;

b) preparing a "snapshot request" at the public safety answering position, the "snapshot request" including the phone number of the 911 mobile station, its geographic location and a radius of search, using the geographic location as a center;

c) sending the "snapshot request" from the public safety answering position to a position server in the communication network;

d) determining the identity of all mobile stations satisfying the criteria of the "snapshot request" by;

collecting, at a mobile switching center, geographic location information for all transmitting mobile stations in communication with said mobile switching center;

creating a database at said mobile switching center for storing the identity of each transmitting mobile station and its current geographic location information;

in response to receiving a request from the position server, searching the database at said mobile switching center to find the identity of transmitting mobile stations satisfying the search criteria; and forwarding to the position server the identity and location information of all mobile stations satisfying the search criteria; and e) creating a transaction table of all mobile stations determined in step d).

11. A method of determining the identity of mobile stations in a communication network that are in a predetermined vicinity of a 911 call from a mobile station, the method comprising the steps of:

a) determining, at a public safety answering position, that a 911 call in progress requires witness identification;

b) preparing a "snapshot request" at the public safety answering position, the "snapshot request" including the phone number of the 911 mobile station, its geographic location and a radius of search, using the geographic location as a center;

c) sending the "snapshot request" from the public safety answering position to a position server in the communication network;

d) determining the identity of all mobile stations satisfying the criteria of the "snapshot request" by;

collecting, at predetermined time intervals at a mobile switching center, geographic location information for all mobile stations in the serving area of said mobile switching center, whether or not the mobile stations are transmitting voice communications;

creating a database at said mobile switching center for storing the identity of each mobile station and its current geographic location information;

in response to receiving a request from the position server, searching the database at said mobile switching center to find the identity of all mobile stations satisfying the search criteria; and forwarding to the position server the identity and location information of all mobile stations satisfying the search criteria; and e) creating a transaction table of all mobile stations determined in step d).

12. A method of determining the identity of mobile stations in a communication network that are in a predetermined vicinity of a 911 call from a mobile station, the method comprising the steps of:

a) determining, at a public safety answering position, that a 911 call in progress requires witness identification;

b) preparing a "snapshot request" at the public safety answering position, the "snapshot request" including the phone number of the 911 mobile station, its geographic location and a radius of search, using the geographic location as a center;

c) sending the "snapshot request" from the public safety answering position to a position server in the communication network;

d) determining the identity of all mobile stations satisfying the criteria of the "snapshot request" by;

creating a location buffer in each mobile station;

updating, at predetermined intervals, the geographic location information of each mobile station and storing the geographic location information in its associated buffer;

in response to receiving a "snapshot request" at the position server, forwarding the "snapshot request" to each relevant mobile switching center;

broadcasting, at each relevant mobile switching center, the "snapshot request" to all mobile stations in its serving area;

searching the location buffers in each mobile station and transmitting mobile station identity and geographic location information from mobile stations satisfying the search criteria to their associated mobile switching centers; and forwarding the responding information from said mobile switching centers to the position server; and e) creating a transaction table of all mobile stations determined in step d).

* * * * *